United States Patent
Ulrich

(10) Patent No.: US 6,431,552 B1
(45) Date of Patent: Aug. 13, 2002

(54) ROTARY SHAFT SEALING SYSTEM

(75) Inventor: Don Ulrich, Bow, NH (US)

(73) Assignee: Improved Materials Strategies, Inc., Houston, TX (US)

( * ) Notice: Subject to any disclaimer, the term of this patent is extended or adjusted under 35 U.S.C. 154(b) by 0 days.

(21) Appl. No.: 09/591,271

(22) Filed: Jun. 9, 2000

Related U.S. Application Data

(60) Provisional application No. 60/138,356, filed on Jun. 10, 1999.

(51) Int. Cl.[7] .................................................. F16J 15/32
(52) U.S. Cl. ........................ 277/558; 277/560; 277/587
(58) Field of Search ................................ 277/512, 549, 277/551, 553, 558, 560, 569, 572, 584, 586, 587

(56) References Cited

U.S. PATENT DOCUMENTS

| | | | |
|---|---|---|---|
| 549,419 A | * | 11/1895 | Wright |
| 2,168,818 A | * | 8/1939 | Condon |
| 2,310,405 A | * | 2/1943 | Dodge |
| 5,013,052 A | * | 5/1991 | Butler et al. |
| 5,076,593 A | * | 12/1991 | Sullivan et al. |
| 5,149,107 A | * | 9/1992 | Maringer et al. |
| 5,325,940 A | * | 7/1994 | Rueckert et al. |
| 5,343,944 A | * | 9/1994 | Bassinger |
| 5,577,741 A | * | 11/1996 | Sink |

* cited by examiner

Primary Examiner—Anthony Knight
Assistant Examiner—John L. Beres
(74) Attorney, Agent, or Firm—Lieberman + Nowak, LLP

(57) ABSTRACT

A rotary shaft sealing system comprising a rotary lip seal and its associated retention gland, wherein the each of the seal and the gland are complimentary of the other within the environment of use. The system is particularly adapted for the sealing of a rotary shaft in an environment wherein the hydraulic pressure upon the fluid within the gland is at least 20 psi, or higher; and, such fluid pressure within the gland is further subject to variation or surges at the time of start-up and/or during operation/use of the rotary shaft. The retention gland geometry assists in the direction and application of hydraulic pressure against the seal so as to increase the radial contact force between the seal lip and the rotary shaft, thus, insuring more complete and effective sealing at this contact interface. The seal of this system is preferable pre-loaded so as to apply positive sealing pressure against the rotary shaft both prior to and during use. In another of the preferred embodiments of this invention, the rotary seal is a composite of dissimilar materials, or comprised of similar materials, wherein the physical properties of each of the components of the composite enhance mechanical resistance of the composite to distortion and resistance to axial movement relative to the rotary shaft.

6 Claims, 3 Drawing Sheets

GLAND WITH STEPPED OD
TO PREVENT SEAL FROM AXIAL MOTION

BACKUP ELEMENT 39

PRESSURE SIDE UP STREAM

8
SEAL WITH CIRCUMFERENTIAL DAM ON SEAL ID

34 SHAFT

PADS ON SEAL FACE 11

PRESSURE SIDE UP STREAM

PROFILED GLAND CORNER TO ACCELERATE FLUID ENTRY INTO GLAND AREA

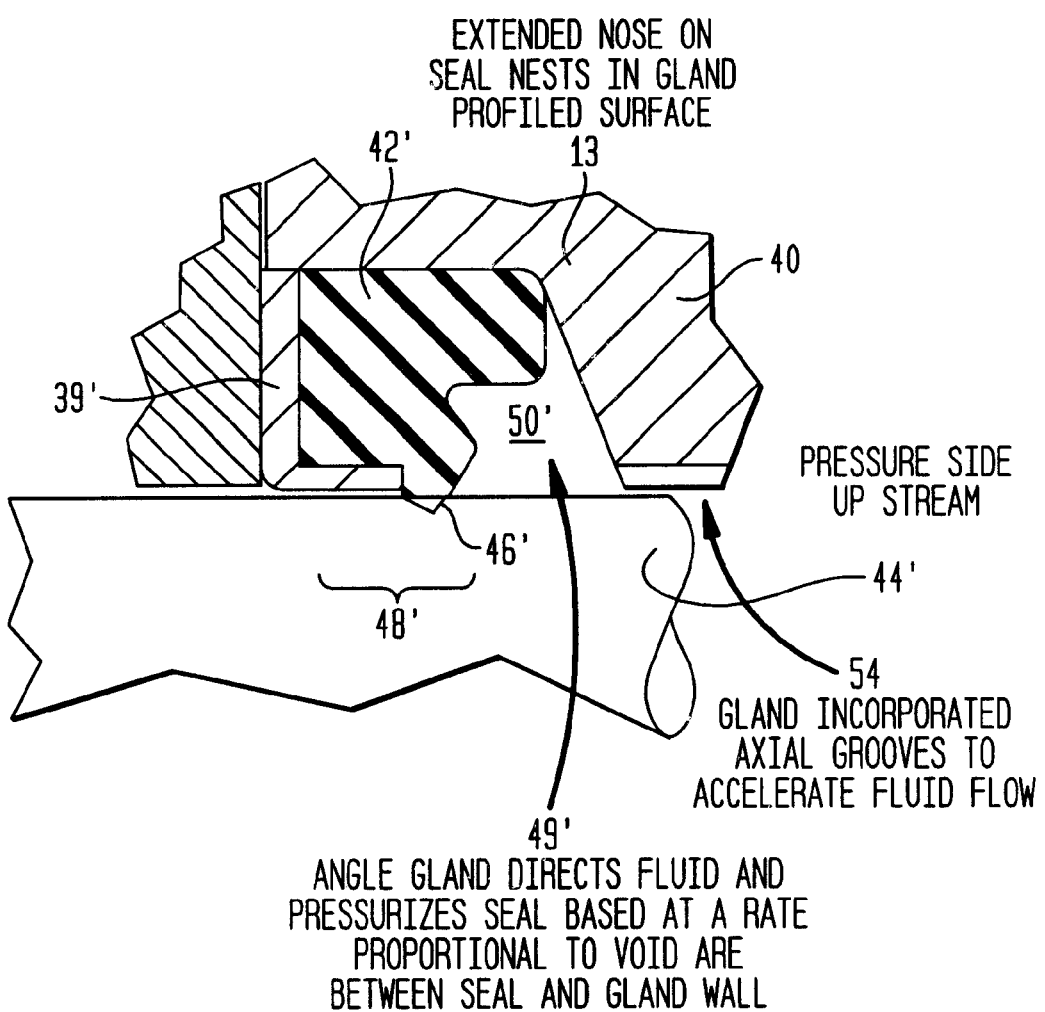

ROTARY SHAFT SEALING SYSTEM

RELATED APPLICATION

This application is based on Provisional Application Ser. No. 60/138,356, filed on Jun. 10, 1999.

BACKGROUND OF THE INVENTION

1. Field of the Invention—This invention relates to an article of manufacture and method. More specifically, this invention relates to a system, incorporating a unique retaining gland and seal design, for rotary shaft sealing and to a method for sealing a rotary shaft. The system of this invention is suitable for high pressure sealing applications, specifically, for sealing of the rotary shaft of pumps and motor seals for automotive, marine, agricultural and industrial applications.

2. Description of the Prior Art—Cartridge rotary seals have been used for many/years in a variety of applications for the sealing of various types of fluids and gases. The function and purpose of such seals includes containment of fluids (lubricants) within the internal environment associated with a rotary shaft, and the exclusion of foreign matter from the external environment from contamination of such lubricants.

Generally, these seals comprise a solid elastomeric/flexible body supported in metal (retaining gland). Typical seal materials utilized in this sealing environment include fluorocarbon polymers, for example, polytetrafluoroethylene, (PTFE), because they exhibit relatively low friction, are chemically inert, and can withstand a variety of temperatures. Moreover, because these materials have self-lubricating properties, they can be used to form a coherent and compliant seal with a rotary shaft with little or no additional lubrication or sealant. Such prior art cartridge seals generally have the elastomer in a bonded relationship with a circular metallic ring (e.g. garter) which can also vary as to geometry. In practice, the metallic portion of the seal is pressed into a housing while the elastomeric seal bears around the rotary shaft. As herein above noted, when plastics are utilized, such as fluoropolymers, the plastic is bonded to the metallic ring and the entire assembly is pressed into the housing (gland) with a degree of interference between the outside diameter (OD) of the seal and the housing to permit retention of the seal assembly within the housing, and, at the same time, provide static sealing of the housing. Dynamic sealing between the seal and the shaft is provided by the elastomer's pressure contact with the shaft. A common problem with such seals is improper bonding between the plastic and the metal which, when subjected to chemical attack and elevated temperature, causes loss or distortion in dimensional stability of the seal under load, resulting in leaking.

U.S. Pat. No. 6,050,572 (to P. J Baisells, issued Apr. 18, 2000) describes a rotary cartridge seal including a separate plastic ring and retainer which are uniquely locked together so as to reportedly provide a residual force therebetween in order to maintain the components together within specific (elevated) temperature parameters. The Baisells system contemplates placement of the seal within an open retention gland; and, the reliance upon the retainer ring for sealing engagement of the seal relative to a rotary shaft. Notwithstanding such improvement, the Baisells device is apparently exclusively reliant upon the materials component of the seal (Teflon™) to provide lubrication at the interface of the seal and the rotary shaft; and, upon a retainer ring for maintaining sealing pressure between the seal and the shaft. Baisells does not specifically address the use of his seal in a high pressure sealing environment, and, thus, the effects of elevated fluid pressure and/or pressure surges upon his seal are neither contemplated nor known.

U.S. Pat. No. 6,050,570 (to D. L. Otto, issued Apr. 18, 2000) describes a seal for an anti-friction bearing (FIG. 2) wherein the primary sealing element comprises a composite of two mechanically and, optimally, chemically distinct materials, (col. 4, lines 36). The resultant composite is described as having a primary element (reference numeral 28) and an insert (reference numeral 66). The Otto seal is further characterized as self-lubricating because the contact lip of the seal insert (reference numeral 66) is formed of polytetraflouroethylene (Teflon™). The Otto seal is designed to retain grease within the race of a roller bearing, and to isolate the race from contamination by the external environment. It would appear that the fluid dynamics of grease in the roller bearing of the Otto seal is not particularly demanding, nor does it appear that the seal is exposed to pressure surges of lubricant or lubricant pressures which could potentially result in the leakage of lubricant at the contact lip of the seal. Ott does not specifically address the use of his seal in a high pressure sealing environment, and, thus, the effects of elevated fluid pressure and/or pressure surges upon his seal are neither contemplated nor known.

U.S. Pat. No. 6,050,571 (to G. Rieder, et al, issued Apr. 18, 2000) describes a sealing arrangement for a bearing bushing, specifically, a sealing arrangement for a bearing mounted pin of a cardan joint (FIG. 1). The Rieder sealing arrangement (Col. 3, line 43 to Col. 4, line 6) comprises a rotary shaft seal (reference numeral 2) with an integrally formed sealing lip (reference numeral 9). The Rieder sealing arrangement contemplates the force fitting of the seal (reference numeral 2) between an armoring (reference numeral 3) an inner wall (reference numeral 4) ofbearing bushing. Rieder has further provided/located an additional seal or a fore-seal (reference numeral 5) upstream from the rotary seal. The fore-seal is intended to bridge a gap between a pin (reference numeral 6) and the bearing bushing (reference numeral 1). The stated design objective of the Rieder system is to provide an extended sealing lip at the interface of the seal and rotary shaft, which the Rieder contends improves the sealing pressure at the interface of the seal and the shaft. Rieder does not specifically address the use of his sealing arrangement in a high pressure sealing environment, and, thus, the effects of elevated fluid pressure and/or pressure surges upon his sealing arrangement are neither contemplated nor known.

Also, for unsprung lip seals, the lip relies on the lip stretch around the shaft to give initial sealing and as fluid pressure increases the initial elastomer load is insignificant. If fluid pressure on the lip causes high frictional heat as the shaft rotates, the rubber heat ages and sets to shaft size. This invention addresses this issue by controlling fluid pressure on the lip and thus reducing heat aging of the rubber.

As is apparent from the foregoing discussion, the configuration of a retention gland and the associated design of a rotary shaft seal, not only determines the effectiveness of the seal, but also its resistance to displacement in the course of use, specifically, its resistance to variable conditions (torque, pressure surges, temperature changes, etc) encountered during use. Thus, it is both critical and essential that each of these seal components be resistant to environmental conditions and support the physical integrity and performance of each other under such variable conditions. While such objective is both desirable and apparent, the achievement thereof is beset with numerous probes, including the potential for wear associated with the relative movement (both axial and rotational) of each of these components, a breakdown in the self-lubricating properties of the sealing materials, controlled access of lubricant to the shaft seal interface; and the, maintenance of critical tolerances of these components within this demanding environment. Generally, the prior art efforts made to accommodate this demanding environment (which have indeed been limited) traditionally involve a series of compromises and, thus, a sacrifice, of, for example, sealing performance in order to extend service life of the seal or visa versa. Accordingly there continues to exist a need to resolve these competing design and performance criteria, without compromise in seal integrity and durability.

OBJECTS OF THE INVENTION

It is the object of this invention to remedy the above as well as related deficiencies in the prior art.

More specifically, it is the principle object of this invention to provide an improved radial lip seal which is suitable for use in high pressure (20 psi or greater) sealing environments.

It is another object of this invention to provide an improved radial lip seal that is suitable for use in high pressure (20 psi or greater) sealing environments, wherein surges or variation in pressure can occur during start-up and/or running operation.

It is yet another object of this invention to provide an improved radial lip seal that is suitable for use in high pressure (20 psi or greater) sealing environments, wherein the fluid pressures on the seal during use exerts a radial (sealing) force upon the seal lip relative to the rotary shaft to effect more complete sealing at the interface of the seal lip and the shaft.

It is still yet another object of this invention to provide an improved radial lip seal that is suitable for use in high pressure (20 psi or greater) sealing environments, wherein the radial lip seal, by design, causes radial loading of the lip relative to the rotary shaft, so as to minimize fluid leakage/by-pass at the seal/shaft interface.

Additional objects of this invention include the adaptation of the rotary lip seal of this invention for sealing of a rotary shaft of pumps and motor seals for automotive, marine, agricultural and industrial applications. .

SUMMARY OF THE INVENTION

The above and related objects are achieved by providing a system comprising a rotary lip seal and its associated retention gland, wherein the each of the seal and the gland are complimentary of the other within the environment of use. In the preferred embodiments of this invention, the rotary shaft sealing system of this invention is particularly adapted for the sealing of a rotary shaft in an environment wherein the hydraulic pressure upon the fluid within the system is at least 20 psi, or higher; and, the hydraulic pressures exerted upon the seal, at the interface of the seal and the rotary shaft, is subject to substantial variation and/or surges at the time of start-up and/or during operation/use of the rotary shaft.

The rotary lip seal of this invention is typically formed from a composition containing an elastomeric material (which can comprise a naturally occurring elastomeric material, a synthetic elastomeric material and/or any combination of such natural and synthetic materials). The materials of this composition are chosen and formulated for there resistance to abrasion, thermal stability and chemical resistance/inertness relative to fluids encountered in use. In the preferred embodiments of this invention, the materials of this composition can and generally include a lubricious agent or component (e.g. Kynar™, a polyvinylidene fluoride; or Teflon™, a polytetraflouroethylene), which upon frictional contact with the shaft, impart/transfer a lubricious agent to the shaft.

In one of the preferred embodiments of this invention, the radial lip seal of this invention, by design, has a shaft mounting hole/orifice wherein the inside diameter (ID) or such hole/orifice is smaller in diameter than the diameter of the rotary shaft. Accordingly, upon installation of the radial lip seal onto the shaft, the lip of the seal is "pre-loaded" relative to its interface with the shaft, thus, exerting positive sealing pressure upon the shaft at this interface.

In another of the preferred embodiments of this invention, the retention gland geometry, relative to the radial seal, causes fluid to be directed onto the seal, and thus positive hydraulic pressure, so at to instantaneously urge the lip of the seal against the shaft, thereby minimizing fluid leakage past the seal.

In another of the preferred embodiments of this invention (FIG. 3), the rotary lip seal comprises a composite, wherein a back-up element is associated with the seal to physically support the seal and prevent displacement and/or distortion of the seal lip relative to the rotary shaft at start-up; and, to further insure proper and complete seal alignment relative to the rotary shaft.

In another of the preferred embodiments of this invention (FIG. 3), the rotary lip seal incorporates a rotary dam comprising an internal lubricant, which upon erosion during pressure contact with the rotary shaft, imparts a lubricous film at the seal/shaft interface so as to shorten the break-in period of a new seal and, thus, facilitate initial leakage control at the interface of the seal and the rotary shaft.

In another of the preferred embodiments of this invention (FIG. 4), the rotary lip seal includes a pad or comparable means on the seal face, to urge the seal toward the downstream surface of the gland cavity.

In another of the preferred embodiments of this invention (FIG. 5), the retention gland internal profile is chamfered and/or otherwise modified to direct fluid flow onto the seal and thereby provide essential instantaneous application of hydraulic pressure to the seal lip at start-up.

BRIEF DESCRIPTION OF THE DRAWINGS

FIG. 5 is sectional (cut-away) view of a the system of this invention illustrating the rotary lip seal in a closed retention gland wherein the upstream internal gland profile is chamfered and/or otherwise modified to accelerate fluid flow and, thus, exert a sealing pressure onto the leading edge of the lip seal.

DESCRIPTION OF THE INVENTION INCLUDING PREFERRED EMBODIMENTS

Figure 1:
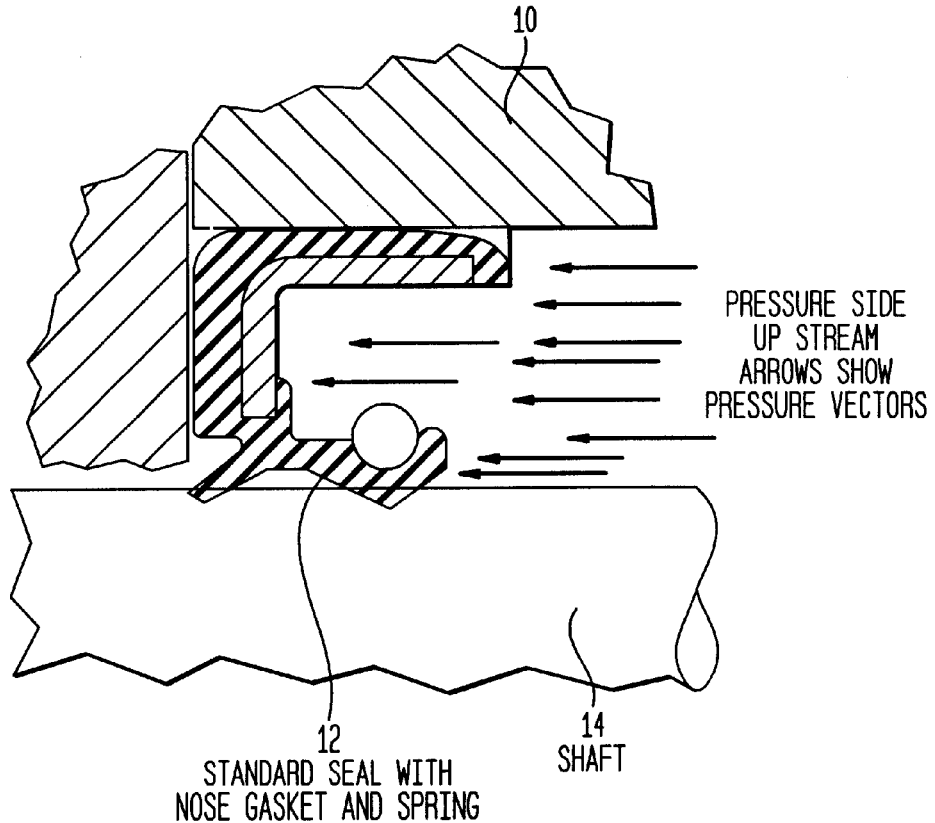
FIG. 1 is sectional (cut-away) view of a rotary seal of the type typically found in the prior art ("open" retention gland design).
Figure 2:
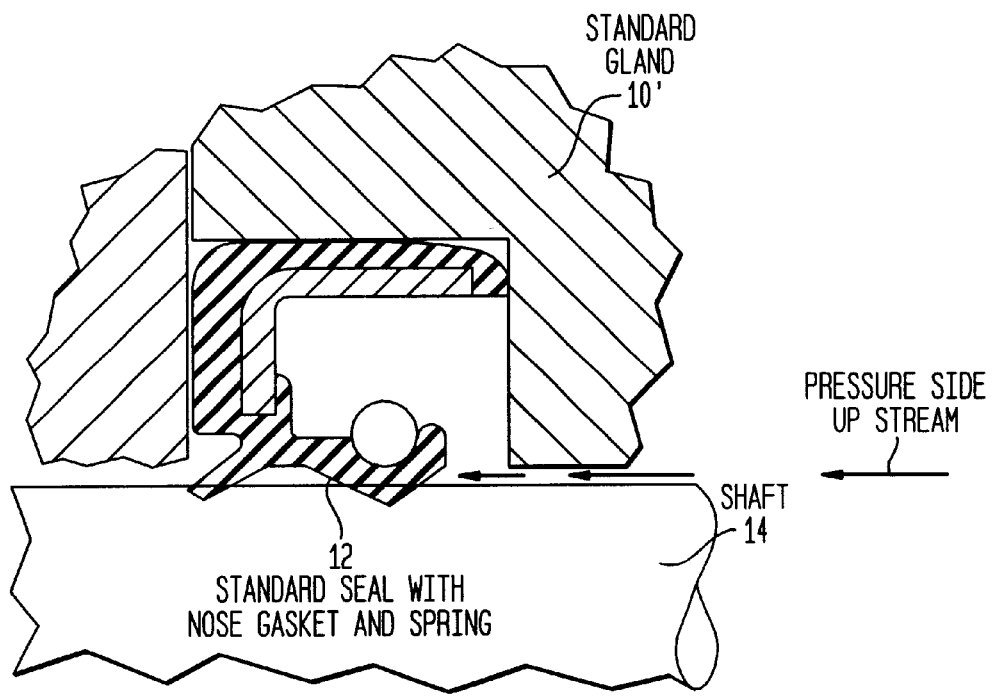
FIG. 2 is sectional (cut-away) view of a rotary seal of the type typically found in the prior art ("standard" or "closed" retention gland design).

The system of this invention, for ease of explanation and understanding, is hereinafter described by means of explanation of the Figures which accompany this application and made part hereof. As above noted, each of FIGS. 1 & 2 illustrate a retention gland and seal geometry of two prior art configurations. Each of these configurations is deficient in one or more material respects where the seal is to be subjected to high fluid pressures or surges in fluid pressures. More specifically, FIG. 1 illustrates a combination of an open retention gland (10) and rotary seal (12) which are ineffective to resist lifting or displacement of the seal (12) from the rotary shaft (14) under hydraulic pressure (arrows indicate direction of fluid pressure) upon such seal. Similarly, FIG. 2 illustrates a combination of a closed retention gland (10') and seal geometry which is also ineffective to prevent the axial movement and lifting or displacement of the seal (12) from the rotary shaft (14) under pressure from the fluids contained within the sealed device.

The key object of invention is a gland that is specifically designed to enhance sealing by directing fluid flow to the seal lip. The gland geometry is such that the fluid is vectored towards the sealing lip first, applying fluid pressure parallel to the shaft and then fluid pressure perpendicular to the lip. These actions cause the lip to exert minimum force on the shaft and thus reduce lip wear and friction heat which in current seal art increases as fluid pressure is primarily vectored perpendicular to the lip during pressurization. The clearance of the seal to the gland is dimensionally defined (current state of the art is not) and further required as a critical design characteristic. The clearance is specified per application based on the time period (milliseconds) fluid pressure spikes from zero to operation pressure.

By controlling the clearance between the seal and the gland, the invention controls fluid direction, fluid velocity and fill rate in the cavity area adjacent to the lip. Envision this relationship like a stream, the gland side and seal side being the banks and the hydraulic fluid or gas being the water. In the current seal design the "river" is wide, see FIG. 1, or the river is narrow acting like a fire hose pointed at the seal lip which can cause the lip to lift. (See FIG. 2). Alternatively, envision, looking at FIG. 2, the narrow river dumping into the "pond" area causing turbulence and applying high load on the seal area adjacent to the coiled steel spring. One can easy envision that the unit load on the spring side of the seal is 3 times greater than the unit load on the leading edge of the seal. This 3 to 1 ratio causes increased load of the lip on the shaft, more heat and more lip wear.

Figure 3:
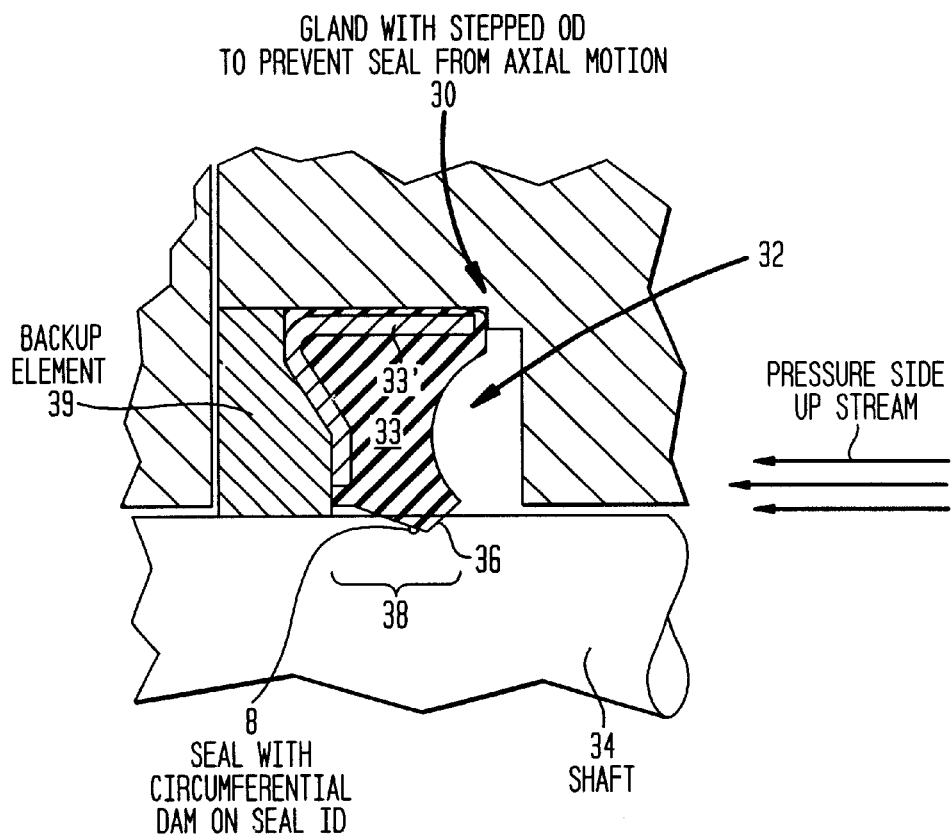
FIG. 3 is sectional (cut-away) view of the system of this invention illustrating the rotary lip seal in a closed retention gland having a stepped inside diameter (ID) and seal backing element to minimize axial motion of the seal relative to a rotary shaft.

In comparison, looking at FIG. 3, note we have the same situation where the fluid enters like a fire hose, however, as the pond fills there is less turbulence because of the rounded "banks" of the seal and note that the fluid vector forces are applied either parallel to the shaft or an acute angle, less than 45° which results in significantly less load on the seal lip, thereby reducing wear and frictional heat compared to current seal designs.

More particularly, FIG. 3 illustrates a rotary shaft sealing system of this invention including a closed retention gland (30) and rotary seal (32) in sealing relationship with a rotary shaft (34). In this illustration, the seal (32) is pre-loaded at the sealing lip (38), by design, so as to apply a positive sealing force relative to the rotary shaft (34) upon installation of the seal (32) relative to the shaft (34). This is accomplished by fabrication of the inside diameter (ID) of the seal with a dimension smaller than the diameter of the rotary shaft. Thus, upon installation of the seal (32) on the shaft (34), the seal (32) readily conforms to the contour (radius) of the shaft and thereby creates a barrier which is and remains in place from and after such installation.

Figure 4:
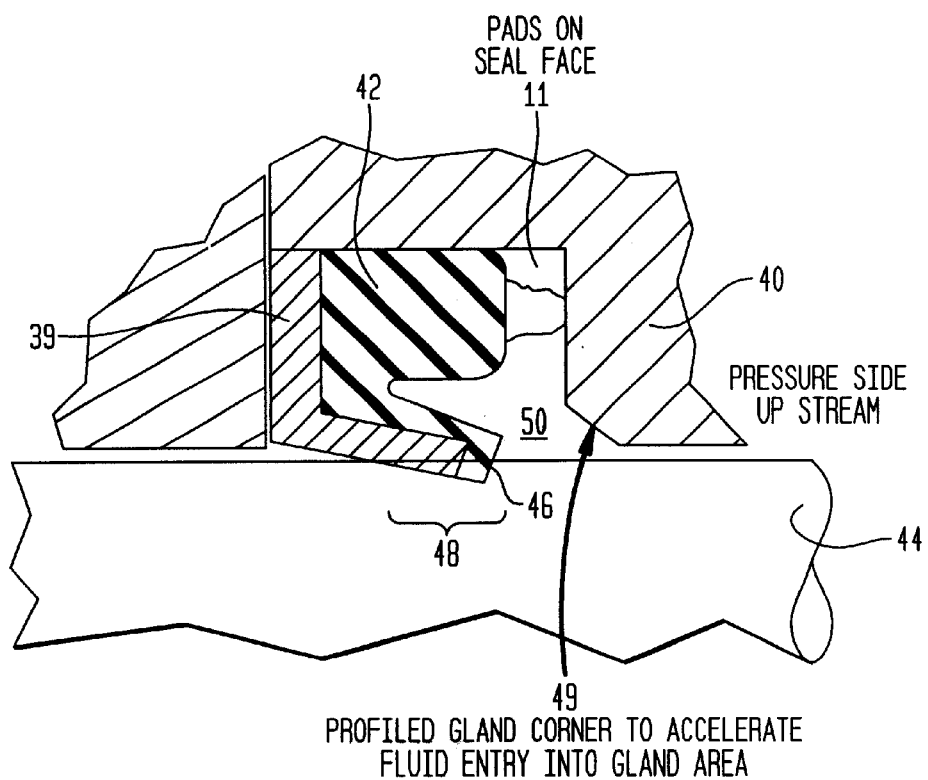
FIG. 4 is sectional (cut-away) view of a the system of this invention illustrating a rotary lip seal in a closed retention gland wherein the seal comprises a composite that includes pads.

In the embodiments of the system of this invention illustrated in FIGS. 3 & 4, the seals (32, 42) are, for the most part, molded from an elastomer having a uniform modulus of elasticity. As set forth herein in greater detail, these seals (32, 42) can have a backing element (39, 39') or comprise a composite of two dissimilar materials (33, 33'). In the preferred embodiments of this invention, this backing or composite component (39, 39') is generally formed of a more rigid or inelastic material than the seal elastomer, and, preferably has a low coefficient of friction relative to the rotary shaft (steel). Polytetrafluorethylene (PTFE), which is sold under the trademark Teflon™ (available from E.I. duPont de Nemours and Company of Wilmington, Del.), is suitable for fabrication of this backing/composite material, but preferred is a rigid thermal plastic material such as Nylon. As illustrated in FIG. 4, the composite component (39') of the seal (42) can ride directly upon the shaft (44), while at the same time adding additional physical integrity to the seal lip (48).

As is further apparent upon comparison of the seals of FIGS. 3 & 4 with the prior art, the mass of the seals of the systems of this invention is more substantial in comparison to the seals of the prior art, so as to further enhance their internal and design resistance to deformation and axial movement. Where, for example, the seals of FIGS. 3 & 4 comprises a composite having internal reinforcement molded into and/or laminated to back of the seal body, the seals' resistance to deformation and axial movement is increased to the extent of the mechanical properties of the reinforcing component/element. Moreover, when such additional substance/mass is added to the seal by means of a backup element (39, 39') (and positioned between the downstream surface of the cavity of the retaining gland and the seal), the sealing pressure on the seal lip (38, 48) is generally augmented.

In the embodiment of the invention illustrated in FIG. 3, the internal cavity of the retention gland is essentially unmodified at the upstream face so as to permit dissipation of the forces from the fluids entering the gland, and, thereby minimize the lifting effect of such fluid movement/pressure upon the seal lip (38).

In both FIGS. 4 & 5, the system of this invention includes modification of the upstream surface (49,49') of gland cavity wall to direct hydraulic fluid pressure onto the seal (42, 42') so as to increase sealing pressure at the interface (46, 46') of the seal lip (48,48') and rotary shaft (44, 44'). More specifically, FIG. 4 illustrates a rotary seal system of this invention wherein the seal geometry and internal cavity of the retention gland compliment each other by combining to direct hydraulic pressure at the interface (46) of the seal lip (48) and the rotary shaft (44) to enhance the sealing pressures at this interface (46). This enhancement is accomplished, in FIG. 4, by chamfering or machining the upstream face (49) of the internal cavity of the retention gland, so as to provide a venturi-like channel to direct hydraulic fluid into the gland (40) and onto the seal (42) to increase sealing pressure at the interface (46) of the seal lip (48) and the rotary shaft (44). More specifically, the shape/design of the seal of the system of FIG. 4 includes a molded depression or trough (50) disposed opposite said venturi-like channel so as to harness the pressure incident to impingement of such hydraulic fluid on said seal, and thereby direct/vector such fluid pressure to the interface (46) of the lip and rotary seal so as to increase the sealing force at this interface (46). In FIG. 4, the seal lip (48) further includes a backing element (39) to minimize axial movement of the seal at the seal/shaft interface and thereby take advantage of the additional sealing pressures incident to the above design.

Similarly, FIG. 5 illustrates an enhancement to the rotary shaft sealing system of Fig. 4, wherein the retention gland cavity (40') has undergone more extensive chamfering or machining of the upstream face (49') of the internal cavity to accommodate additional hydraulic fluid volume within the cavity and, thus, produce/exert additional sealing pressure on the lip of the rotary seal. In addition, FIG. 5 illustrates the addition of multiple axial grooves (54) machined into the fluid inlet or upstream channel of the retention gland. The number and placement of such axial channels serve to accelerate the flow of hydraulic fluid into the retention gland chamber, and thereby increase the sealing pressures on the seal lip (48') at start-up, and/or during cyclic operation of the device incorporating the system of this invention. In FIG. 5 the "river" (as described above) needs to have its banks contoured and located to urge, and direct, the fluid in a "spray" pattern that allows fluid pressure to build up first on top of the lip. In this invention we need initial pressure down on the lip to overcome the hoop strength and bending resistance, of the lip element 39. If primary fluid pressure is firstly applied parallel or actually to the lip of the element 39, it will not rest on the shaft correctly resulting on higher pressure on the rubber lip as it contacts the shaft causing more frictional heat.

The invention uses the pads reference (FIG. 4) to (1) control the distance of the seal "banks" and sides, to the side of the gland during seal installation, (2) after seal installation the invention assures that the distance is maintained especially in an application were a vacuum is generated (drawn) by fluid rapid evacuation.; Compression of the pads by a minimum of 5% deflection would result in the pads becoming an anti-rotation feature which is preferred when a low friction material is used for the back up component 39 (See FIG. 4).

The invention, is as stated, a high pressure seal solution, comprised of a seal geometry matched with a complementary gland geometry that in combination offer improved sealing and longer seal life than prior art.

The foregoing description of this invention has been provided as illustrative of a number of the preferred embodiments thereof and is not intended as defining the metes and bounds of the invention, which has been reserved for the following claims

What is claimed is:

1. An improved rotary shaft sealing system including a closed seal retention gland, a cavity within said gland for retaining a flexible rotary seal, said flexible rotary seal comprising an elastomeric material and means for retaining said rotary seal in sealing relation to a rotary shaft, the improvement comprising:

wherein said cavity has a surface which is tangential to said rotary shaft, an upstream surface and a downstream surface, said upstream surface of said cavity including means integral with said upstream surface for directing hydraulic fluid entering said cavity onto a surface of said flexible rotary seal disposed opposite said upstream surface;

said flexible rotary seal having at least one rounded bank on its upstream surface, said at least one rounded bank residing within said gland cavity for retaining said rotary seal and acting to reduce turbulence of said hydraulic fluid entering the cavity and directing vector forces of said hydraulic fluid either parallel or at an angle less than 45° to said rotary shaft, thereby reducing load on the seal lip;

whereby hydraulic fluid entering said gland cavity under pressure is directed by said hydraulic fluid directing means of said upstream surface of said gland cavity onto said complimentary portion of said flexible rotary seal so as to exert sealing pressure on said seal at an interface of said rotary seal and said rotary shaft.

2. The improved rotary shaft sealing system of claim 1, wherein said rotary seal comprise a composite structure having at least two components, a first component for sealing engagement with said rotary shaft and a second component for physical reinforcement of said first component, said first component comprising a compliant elastomer in pressure contact with a surface of said rotary shaft, and said second component being further characterized as being substantially less flexible than first component and resistant to axial movement and displacement by hydraulic pressure and changes in hydraulic pressure on said composite.

3. The improved rotary shaft sealing system of claim 1, wherein said rotary seal includes a circumferential dam in contiguous relation to said rotary shaft, said circumferential dam being further characterized as comprising an erosive material which, during relative movement of said seal and said shaft, imparts a lubricous deposit to said shaft, and thereby enhances sealing between said seal and said rotary shaft.

4. The improved rotary shaft sealing system of claim 1, wherein said retaining gland cavity is characterized by one or more surface features or steps for engaging complimentary surface features or dimension of said rotary seal so as to inhibit axial movement of said seal within said cavity.

5. The improved rotary shaft sealing system of claim 1, wherein said retaining gland is further characterized as having an inlet for permitting flow of hydraulic fluid into said gland cavity.

6. In a method for hydraulic sealing of a rotary shaft with a rotary shaft sealing system having a closed retention gland and a flexible rotary seal, the improvement comprising:

providing a rotary shaft sealing system comprising said closed retention gland having a cavity for retaining a rotary seal, wherein said cavity has a surface which is tangential to said rotary shaft, an upstream surface and a downstream surface, said upstream surface of said cavity including means integral with said upstream surface for directing hydraulic fluid entering said cavity onto a surface of said flexible rotary seal disposed opposite said upstream surface, and a flexible rotary seal having at least one rounded bank on its upstream surface, said at least one rounded bank residing within said gland cavity for retaining said rotary seal and acting to reduce turbulence of said hydraulic fluid entering the cavity and directing vector forces of said hydraulic fluid either parallel or at an angle less than 45° to said rotary shaft, thereby reducing load on the seal lip; and introducing hydraulic fluid, under pressure, into said cavity of said retaining gland, whereby hydraulic fluid entering said gland cavity is directed by said hydraulic fluid directing means of said upstream surface of said gland cavity onto said complimentary portion of said flexible rotary seal so as to exert sealing pressure on said seal at an interface of said rotary seal and said rotary shaft.

* * * * *